United States Patent
Idler et al.

(10) Patent No.: US 8,526,577 B2
(45) Date of Patent: Sep. 3, 2013

(54) SYSTEM AND METHOD TO ACCESS CONTENT FROM A SPEECH-ENABLED AUTOMATED SYSTEM

(75) Inventors: Julie A. Idler, Bartlett, IL (US); Robert R. Bushey, Cedar Park, TX (US); Benjamin A. Knott, Beaverscreek, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2483 days.

(21) Appl. No.: 11/212,939

(22) Filed: Aug. 25, 2005

(65) Prior Publication Data
US 2007/0047718 A1  Mar. 1, 2007

(51) Int. Cl.
*H04M 1/64*  (2006.01)

(52) U.S. Cl.
USPC ........... 379/88.04; 379/88.17; 370/352

(58) Field of Classification Search
USPC ............. 379/265.02–266.04, 88.04, 88.17
See application file for complete search history.

(56) References Cited

U.S. PATENT DOCUMENTS

| | | | |
|---|---|---|---|
| 4,953,204 A | 8/1990 | Cuschleg, Jr. et al. | |
| 4,967,405 A | 10/1990 | Upp et al. | |
| 5,335,269 A | 8/1994 | Steinlicht | |
| 5,455,903 A | 10/1995 | Jolissaint et al. | |
| 5,497,373 A | 3/1996 | Hulen et al. | |
| 5,522,046 A | 5/1996 | McMillen et al. | |
| 5,530,744 A | 6/1996 | Charalambous et al. | |
| 5,555,299 A | 9/1996 | Maloney et al. | |
| 5,590,186 A | 12/1996 | Liao et al. | |
| 5,652,789 A | 7/1997 | Miner et al. | |
| 5,754,639 A | 5/1998 | Flockhart et al. | |
| 5,754,978 A | 5/1998 | Perez-Mendez et al. | |
| 5,884,262 A * | 3/1999 | Wise et al. ................. | 704/270.1 |
| 5,923,745 A | 7/1999 | Hurd | |
| 5,940,476 A | 8/1999 | Morganstein et al. | |
| 5,946,388 A | 8/1999 | Walker et al. | |
| 5,953,704 A | 9/1999 | McIlroy et al. | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,049,594 A | 4/2000 | Furman et al. | |
| 6,118,866 A | 9/2000 | Shtivelman | |

(Continued)

FOREIGN PATENT DOCUMENTS

| | | |
|---|---|---|
| EP | 0 424 015 A2 | 4/1991 |
| EP | 0 424 015 A3 | 4/1991 |

(Continued)

OTHER PUBLICATIONS

U.S. Appl. No. 10/898,722, filed Jul. 23, 2004.

(Continued)

*Primary Examiner* — Simon Sing
(74) *Attorney, Agent, or Firm* — Toler Law Group, PC

(57) ABSTRACT

A method of accessing content at a speech-enabled automated system is disclosed and comprises receiving a verbal input at an interactive voice response system. The interactive voice response system can include one or more table-driven state tables, in which action-objects are embedded. Further, the method can include retrieving content from an information store, wherein the content is associated with the verbal input. The information store is logically external to the interactive voice response system.

29 Claims, 6 Drawing Sheets

(56) References Cited

U.S. PATENT DOCUMENTS

| | | | |
|---|---|---|---|
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,192,398 B1* | 2/2001 | Hunt | 709/213 |
| 6,259,786 B1 | 7/2001 | Gisby | |
| 6,269,153 B1 | 7/2001 | Carpenter et al. | |
| 6,314,402 B1* | 11/2001 | Monaco et al. | 704/275 |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1* | 4/2002 | Uppaluru et al. | 379/266.04 |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,434,687 B1* | 8/2002 | Huppenthal | 712/32 |
| 6,442,247 B1 | 8/2002 | Garcia | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,113 B1 | 4/2003 | Dhir et al. | |
| 6,570,967 B2 | 5/2003 | Katz | |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1* | 9/2003 | Elliott et al. | 370/352 |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2* | 2/2004 | Knott et al. | 379/88.22 |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1* | 12/2004 | Boyle et al. | 370/539 |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2* | 2/2005 | Joseph et al. | 379/265.07 |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,873,693 B1* | 3/2005 | Langseth et al. | 379/201.02 |
| 6,879,683 B1 | 4/2005 | Fain et al. | |
| 6,885,734 B1 | 4/2005 | Eberle et al. | |
| 6,891,932 B2* | 5/2005 | Bhargava et al. | 379/88.02 |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,944,592 B1* | 9/2005 | Pickering | 704/251 |
| 6,963,983 B2 | 11/2005 | Munson et al. | |
| 7,006,605 B1 | 2/2006 | Morganstein et al. | |
| 7,131,577 B2* | 11/2006 | Obara et al. | 235/379 |
| 7,277,924 B1* | 10/2007 | Wichmann et al. | 709/217 |
| 7,660,715 B1* | 2/2010 | Thambiratnam | 704/244 |
| 7,685,270 B1* | 3/2010 | Vermeulen et al. | 709/224 |
| 7,881,656 B2* | 2/2011 | Khedouri et al. | 455/3.01 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0118159 A1 | 6/2003 | Shen et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth | |
| 2003/0202640 A1 | 10/2003 | Knott et al. | |
| 2003/0202643 A1* | 10/2003 | Joseph et al. | 379/88.18 |
| 2003/0202649 A1 | 10/2003 | Haug, Jr. et al. | |
| 2003/0204435 A1 | 10/2003 | McQuilkin et al. | |
| 2003/0228007 A1 | 12/2003 | Kurosaki | |
| 2003/0235287 A1 | 12/2003 | Margolis | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1* | 3/2004 | Knott et al. | 379/88.16 |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083479 A1 | 4/2004 | Bondarenko et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0120473 A1 | 6/2004 | Birch et al. | |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2005/0008141 A1 | 1/2005 | Kortum et al. | |
| 2005/0015744 A1 | 1/2005 | Bushey et al. | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0055216 A1 | 3/2005 | Bushey et al. | |

| | | | |
|---|---|---|---|
| 2005/0058264 A1* | 3/2005 | Joseph et al. | 379/88.18 |
| 2005/0075894 A1* | 4/2005 | Bushey et al. | 705/1 |
| 2005/0078805 A1 | 4/2005 | Mills et al. | |
| 2005/0080630 A1 | 4/2005 | Mills et al. | |
| 2005/0080667 A1 | 4/2005 | Knott et al. | |
| 2005/0131892 A1 | 6/2005 | Knott et al. | |
| 2005/0132262 A1 | 6/2005 | Bushey et al. | |
| 2005/0135575 A1* | 6/2005 | Haskey et al. | 379/88.18 |
| 2005/0135595 A1* | 6/2005 | Bushey et al. | 379/265.01 |
| 2005/0141692 A1 | 6/2005 | Scherer et al. | |
| 2005/0169441 A1 | 8/2005 | Yacoub et al. | |
| 2005/0169453 A1* | 8/2005 | Knott et al. | 379/265.02 |
| 2005/0201547 A1 | 9/2005 | Burg et al. | |
| 2005/0240411 A1 | 10/2005 | Yacoub | |
| 2006/0285535 A1* | 12/2006 | Metcalf et al. | 370/352 |
| 2007/0047728 A1* | 3/2007 | Raju et al. | 379/373.02 |

FOREIGN PATENT DOCUMENTS

| | | |
|---|---|---|
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 10/975,023, filed Oct. 27, 2004.
Ogino, Tsukasa et al., "Technologies for Internet Infrastructure: Eliminating the World Wide Wait," iNet Japan, Jul. 18-21, 2000; www.isoc.org/inet2000/cdproceedings/1g/index.htm; 19 pages.

* cited by examiner

SYSTEM AND METHOD TO ACCESS CONTENT FROM A SPEECH-ENABLED AUTOMATED SYSTEM

FIELD OF THE DISCLOSURE

The present disclosure relates to speech-enabled automated systems.

BACKGROUND

Many companies employ automated systems to provide information that customers request concerning products and services. In order to cut down on costs and provide consistent information, some systems employ automated, self-service call response applications that deliver content to callers. Typically, callers can select from available options, by listening to lists of topics and pressing corresponding touch-tone keys. In recent years, some companies have employed speech-enabled technology that allows callers to respond to prompts with verbal statements. Using speech inputs can save time because callers can avoid listening to choices before making a selection. Speech-enabled self-service systems also reduce costs, by reducing the need for human call center agents.

Rather than taking valuable agent time to explain, for example, how to set up CallNotes, an automated application can perform this service. Customers who purchase products and services need to know how to perform basic functions including setup, turn it on, turn it off, and other such functions. It is fairly common for customers to call agents and ask them to explain how to do such functions. An effective, alternative approach is to provide a self-service application that will provide this information to the caller.

Speech-enabled systems can be constructed using prompts and content that may be embedded in fixed state tables. The fixed state tables can be implemented via computer programs by inserting the text of the prompts and the associated content directly into the computer programs. As the length or logical complexity of the prompts and content increases, the use of fixed state tables becomes inefficient. The resulting computer programs can take up substantial portions of memory, and the extra lines of program code can make the programs increasingly difficult to debug and modify. Hence, the costs associated with utilizing fixed state tables can become prohibitive as the number of prompts and the amount of content increases.

Accordingly, there is a need for an improved system and method of accessing content in a speech-enabled automated system.

DETAILED DESCRIPTION OF THE DRAWINGS

Figure 1:
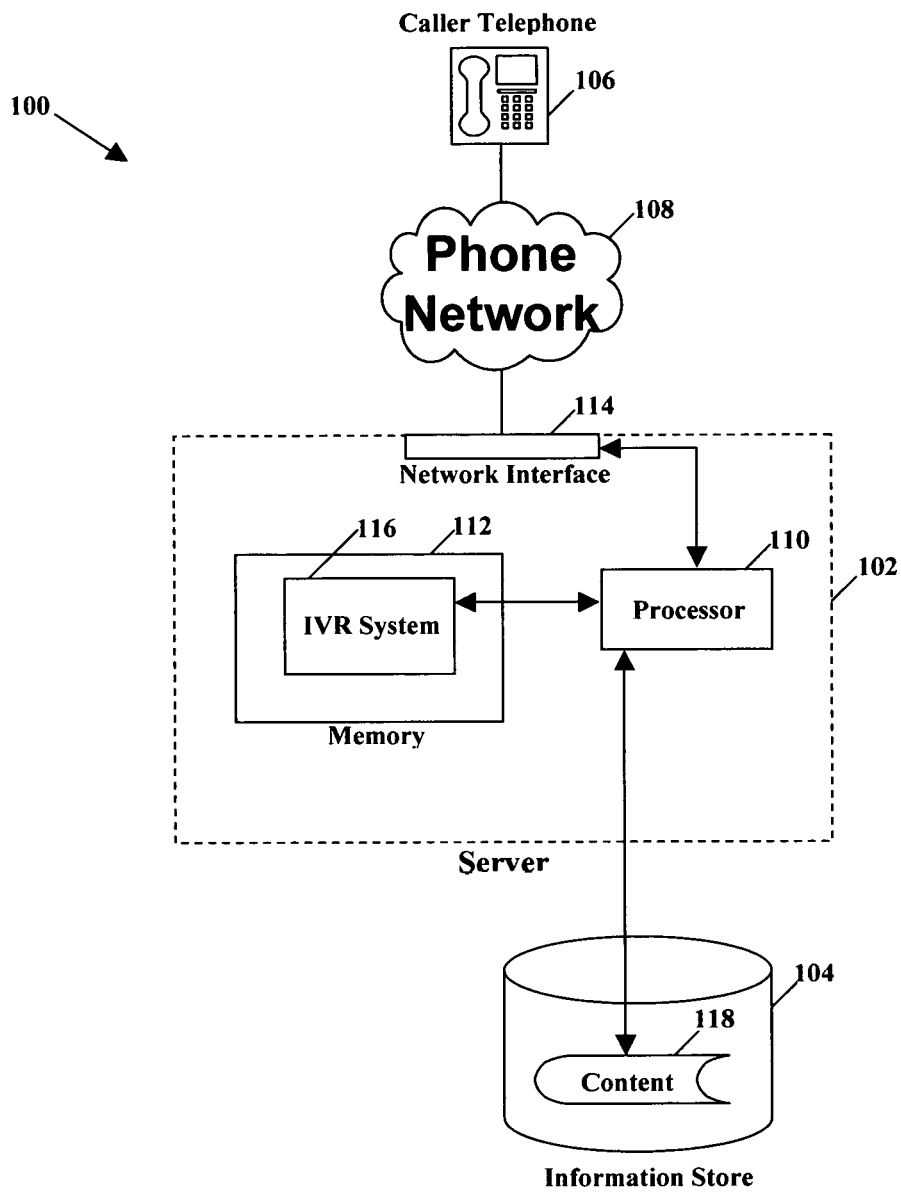
FIG. 1 is a block diagram illustrating one embodiment of a system to access content in a speech-enabled automated system.

The present disclosure is directed to a system and method to access content in a speech-enabled automated system. The method includes receiving a verbal input at an interactive voice response system. The method also includes retrieving content from an information store that is logically external to the interactive voice response system, based on the verbal input. In a particular embodiment, the method can also include communicating a prompt to a caller, prior to receiving the verbal input.

In a particular embodiment, the method may include determining a first action-object and an associated first value, based on the verbal input. In this particular embodiment, the method includes retrieving content associated with the first value from the information store. One or more next action-objects may be determined, based on the verbal input, and content associated with those next values may also be retrieved from the information store. In another particular embodiment, the method may also include receiving a non-verbal input and determining one or more action-objects and associated values, based on the non-verbal input. In this particular embodiment, the method also includes retrieving content associated with the values derived from the non-verbal input.

In a particular embodiment, the method also includes submitting a query to the information store, in order to retrieve content.

In a particular embodiment, the method also includes communicating retrieved content to a caller. The content may comprise table-driven instructional content.

An alternate method of providing content at a speech-enabled automated system includes storing a plurality of content items in an information store. Each of the plurality of content items is associated with at an action-object. Each action-object includes a parameter, such as an action, a call purpose, a product, a service, a location, a language, or any combination thereof. In an illustrative embodiment, services may include call notes, voice mail, call blocking, privacy management, call tracing, call return, auto-redial, call forwarding, call waiting, direct reply, caller ID, or remote access.

The alternate method also includes receiving a query from an interactive voice response system that is logically external to the information store. In a particular embodiment, each query may include an action-object having a value derived from a verbal input received at the interactive voice response system. In another particular embodiment, each query may also include an action-object having a value derived from a non-verbal input received at the interactive voice response system.

In a particular embodiment, the alternate method can also include determining whether a modification of content is in progress at the information store. If such modification is in progress, any processing of the query may be suspended until the modification is complete. If it is determined that such processing is to be suspended, the query is processed after the modification of content is complete.

In a particular embodiment, the alternate method can also include searching one or more records at the information store, for one or more content items. In this particular embodiment, the method also includes retrieving one or more content items from the record or records searched, and communicating those content items to the interactive voice response system. The content may comprise table-driven instructional content.

Various embodiments of the methods described herein may be implemented by a system of managing content at a speech-enabled automated system. The system may comprise a server having a processor and a memory accessible to the processor. In a particular embodiment, the system can also include an interface to communicate with at least one communications network, such as a public switched telephone network, a Voice-over-Internet Protocol network, a cellular telephone network, a mobile telephone network, or a combination thereof.

One or more computer programs may be embedded in the memory, including an interactive voice response system. The interactive voice response system may include instructions to carry out various actions, including processing verbal inputs and retrieving content associated with such verbal inputs from a logically external information store. The interactive voice response system can also include instructions to retrieve content associated with such verbal inputs. In a particular embodiment, the interactive voice response system can also include instructions to submit a query to the information store.

In a particular embodiment, the information store may store information as a plurality of content items. In this particular embodiment, the information store may also include computer-readable instructions to search one or more records at the information store, for one or more content items, and to retrieve such content items from the record or records. In an illustrative embodiment, the information store may include computer-readable instructions to search one or more records at the information store, for at least one of the plurality of content items. In this illustrative embodiment, the information store may also include computer-readable instructions to retrieve, from the record or records, the one or more content items.

Various embodiments of the methods described herein may be implemented by a computer program embedded within a computer-readable medium. The computer program can include instructions to process a verbal input and instructions to retrieve content associated with the verbal input, from an information store that is logically external to the computer program. The computer program can also include instructions to communicate the retrieved content to a caller.

In a particular embodiment, the computer program can include instructions to determine one or more action-objects and one or more values associated with the action-object(s), wherein the one or more values are derived from the verbal input. In this particular embodiment, the computer program can also include instructions to retrieve content associated with the value(s).

In an alternate embodiment, the computer program can also include instructions to process a non-verbal input. In this alternate embodiment, the computer program can also include instructions to determine one or more action-objects and one or more values associated with the action-object(s), wherein the one or more values are derived from the non-verbal input. Moreover, the computer program can also include instructions to retrieve content associated with the value(s).

In a particular embodiment, the computer program can also include instructions to submit at least one query to the information store.

Referring to FIG. 1, a system is shown and is generally designated 100. As shown, the system 100 includes a server 102 that communicates with an information store 104. Additionally, the server 102 can communicate with a telephone 106 via a telephone network 108. In a particular embodiment, the telephone network 108 may include a public switched telephone network (PSTN), an internet protocol (IP) network, a cellular telephone network, a mobile telephone network, or any other network over which voice data may be transmitted.

As depicted in FIG. 1, the server 102 can include a processor 110 and a memory device 112 that is accessible to the processor 110. In a particular embodiment, the server 102 receives calls from caller telephones, such as the caller telephone 106, via a network interface 114 to the telephone network 108. The network interface 114 may be any interface suited to facilitate communication between a server and one or more communication networks. For example, the network interface 114 can facilitate communication between a server and a public switched telephone network (PSTN), an internet protocol (IP) network, a cellular telephone network, a mobile telephone network, or any other telephone network over which voice data may be transmitted.

FIG. 1 further depicts an interactive voice response system including a computer program 116 that is executable by the processor 110 and that is embedded within the memory 112. In a particular embodiment, the server 102 can include one or more additional computer programs that are executable by the processor 110 and that may be stored within the memory 112. In an illustrative embodiment, the interactive voice response system 116 comprises computer-readable instructions to process one or more verbal inputs that are received from a caller and to retrieve content associated with the verbal input or inputs from an information store 104 that is logically external to the interactive voice response system 116.

In a particular embodiment, the information store 104 may be embedded within the memory 112, without being logically integrated with the interactive voice response system 116. In another embodiment, the information store 104 may be physically located at server 102, while being external to the memory device 112 and thus logically external to the interactive voice response system 116. In another embodiment, the information store 104 may be physically located external to the server 102 and also logically external to the interactive voice response system 116.

In an illustrative embodiment, the interactive voice response system 116 communicates with the information store 104 and retrieves selected portions of the content 118. In a particular embodiment, the interactive voice response system 116 retrieves selected portions of the content 118 by submitting one or more queries based on received voice input from a caller to the information store 104. Each query may be based on verbal inputs received from a caller. In a particular embodiment, each query can include one or more action-objects and one or more values that have been assigned to one or more of the included action-objects. Action-objects are described in further detail, with reference to FIGS. 4 and 5.

As indicated in FIG. 1, the information store 104 can store the content 118. In a particular embodiment, the information store 104 may be any storage device or computer program suited to store data and associate the data with fields, attributes, criteria, or the like. In a particular embodiment, the information store can be a database that includes one or more records.

In a particular embodiment, the information store 104 stores the content 118 as a plurality of different content items or portions. Further, each portion of the content 118 may be associated with at least one action-object and with at least one value for each such action-object. Also, in a particular embodiment, the information store 104 may further comprise computer instructions to search one or more records at the information store and retrieve one or more portions of the content 118. In an exemplary embodiment, each portion of content 118 stored at the information store 104 can include one or more types of table-driven content, such as audio data, non-audio data, or instructional content.

In an illustrative embodiment, the interactive voice response system 116 may communicate selected portions or all of the content 118 that are retrieved from the information store 104 to the caller telephone 106 via the processor 110 and the network interface 114.

Additionally, the interactive voice response system 116 can include computer-readable instructions that are executable to process one or more verbal inputs. Such computer instructions may include instructions that are executable by the processor 110 to assign a first value that is derived from the verbal input or inputs to a first action-object pair. In a particular embodiment, the computer-readable instructions may retrieve content associated with the first action-object pair and the first value. In a particular embodiment, the computer-readable instructions may assign a next value that is derived from the verbal input or inputs, to a next action-object. Moreover, the instructions may retrieve content associated with the next action-object and the next value.

In another particular embodiment, the interactive voice response system 116 may further include computer-readable instructions that are executable to process one or more non-verbal inputs received during a call and to retrieve content associated with the non-verbal input or inputs from the information store. In a particular embodiment, the computer-readable instructions may assign a second value that is derived from one or more of the non-verbal inputs, to a second action-object. Further, the computer-readable instructions may retrieve content associated with the second action-object and the second value.

In a particular embodiment, the computer-readable instructions may assign an additional value, derived from the non-verbal input or inputs, to an additional action-object. Additionally, the computer-readable instructions may retrieve content associated with the additional action-object and the additional value.

In a particular embodiment, the interactive voice response system 116 may further include one or more table-driven state tables, in which action-objects are embedded. An example of a table-driven state table is described further with reference to FIG. 4.

Figure 2:
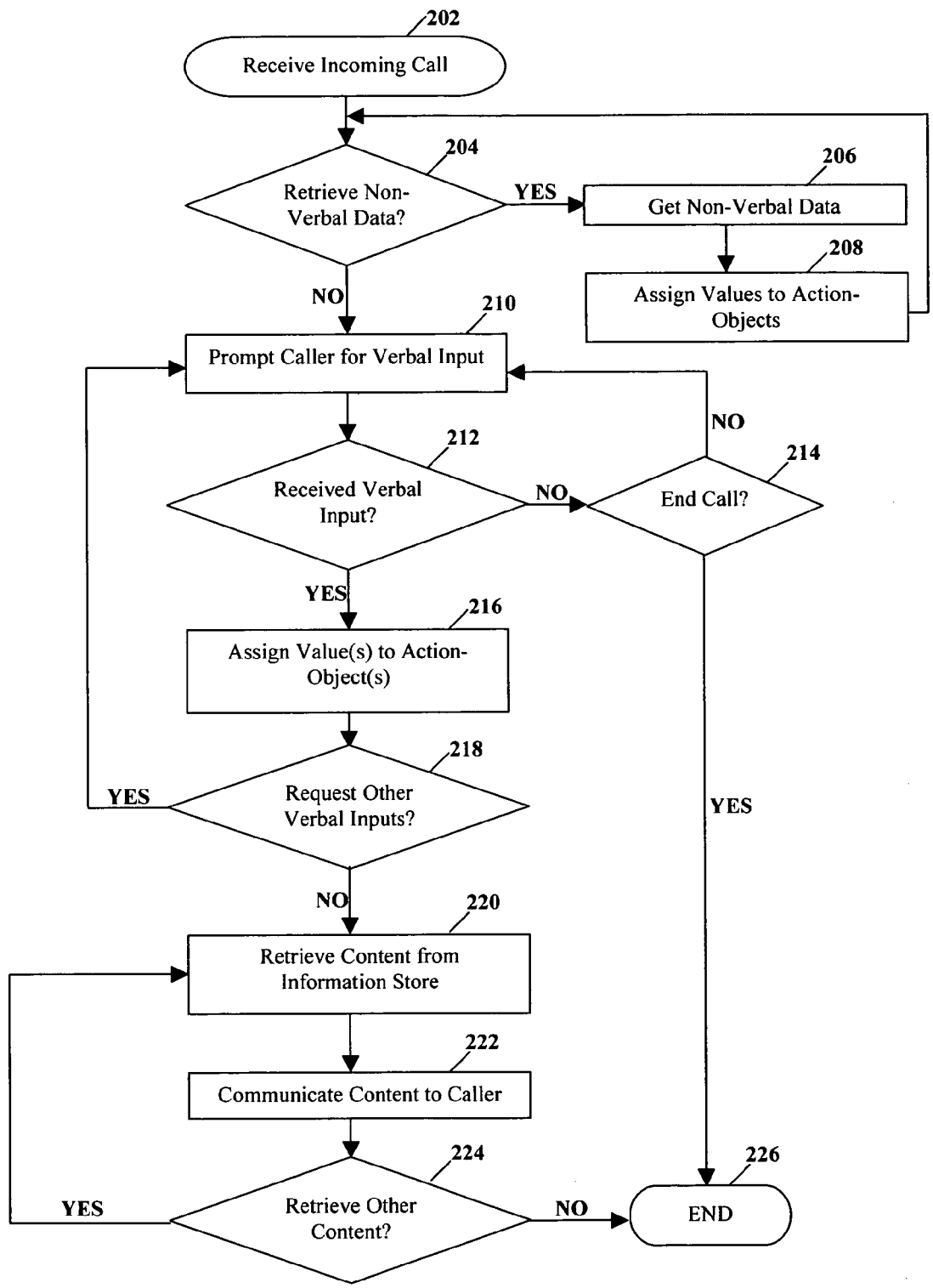
FIG. 2 is a flow diagram illustrating a method of accessing content in a speech-enabled automated system.

Referring to FIG. 2, a method to access content in a speech-enabled automated system is shown and commences at block 202. At block 202, an incoming call is received at a call center from a caller, such as a customer. The call may be received at a server including a processor and a memory accessible by the processor. An interactive voice response system (the "IVR") may be embedded in the memory and is executable by a processor. The server may comprise additional computer programs. In a particular embodiment, the IVR may further comprise a table-driven state table, in which one or more identified action-objects are embedded.

Moving to decision step 204, the IVR, or another program embedded in the server memory, determines whether to retrieve non-verbal data. If the IVR or the other program determines to retrieve non-verbal data, the method proceeds to block 206, and one or more non-verbal inputs are received at the server. In an exemplary embodiment, non-verbal inputs may include any information that is not received from a caller's verbal statements. For example, non-verbal inputs may include data, selections, preferences, and the like, which are entered by the caller using an input device, such as touch-tone keys on a phone. Such non-verbal inputs may also include data, selections, preferences, and the like, that are retrieved from other sources. In one embodiment, non-verbal inputs are retrieved from a database or other data source using caller ID information or other information that indicates the source of a call.

The method proceeds to block 208, where the IVR processes one or more non-verbal inputs. In a particular embodiment, the IVR can process the non-verbal input or inputs, by assigning a value to an action-object, an additional value to an additional action-object, and so on. In a particular embodiment, each value assigned at block 208 is derived from at least one of the retrieved non-verbal inputs. The process may continue, until certain values, or all possible values, are derived from the non-verbal input or inputs. From block 208, the method may return to decision step 204, and the IVR or other program determines whether to retrieve additional non-verbal inputs. If the IVR or other program determines not to retrieve any non-verbal inputs, or any additional non-verbal inputs, the method proceeds to block 210. In an illustrative embodiment, the IVR may process each non-verbal input as it is received. In another illustrative embodiment, the IVR may process each non-verbal input after multiple non-verbal inputs have been received. In another illustrative embodiment, the IVR may process each non-verbal input after the IVR or other program determines to retrieve no additional non-verbal input.

Returning to block 210, the IVR prompts the caller for one or more verbal inputs. The method proceeds to decision step 212, and the IVR determines whether it has received verbal inputs from the caller. If the IVR determines that it has not received verbal inputs for which it has prompted the caller, the method proceeds to block 214. The IVR may determine to end the call due to lack of response by the caller, in which case the method terminates at 226. Alternatively, the IVR may determine to prompt the caller again, in which case the method returns to step 210.

After one or more verbal inputs are received, the method proceeds to block 216 and the IVR processes each verbal input. In a particular embodiment, the IVR can process the verbal input or inputs by assigning a first value to at least one first action-object, a next value to a next action-object, and so on. Each value assigned, at block 216, is derived from at least one of the received verbal inputs.

In a particular embodiment, the method proceeds to decision step 218 and the IVR or other program may determine whether to request additional verbal inputs. If the IVR, or other program, determines to request additional verbal inputs, the method returns to step 210 and the caller is prompted for one or more additional verbal inputs. If the IVR, or other program, determines not to retrieve any additional verbal inputs, the method proceeds to block 220. In an illustrative embodiment, the IVR may process each verbal input as it is received. In another illustrative embodiment, the IVR may process each verbal input after multiple verbal inputs have been received. In another illustrative embodiment, the IVR may process each verbal input after the IVR or other program determines to retrieve no additional verbal inputs.

As shown at block 220, the IVR retrieves content from an information store. In a particular embodiment, the information store is logically external to the IVR. Further, a plurality of portions of content is stored at the information store, and each portion of content is associated with one or more action-objects and one or more action-object values. In a particular embodiment, the IVR retrieves content associated with one or more action-objects and the values assigned to those action-objects, based on the verbal inputs received and processed. In a particular embodiment, the IVR may further retrieve content associated with one or more action-objects and the values assigned to those action-objects, based on non-verbal inputs.

Moving to block 222, the IVR may communicate content retrieved from the information store, to the caller. Moreover, the content can be communicated to the caller over a network connected with the server, and via a telephony device used by the caller.

In a particular embodiment, the content stored in the information store comprises audio content. The content is further described with reference to FIG. 5.

Proceeding to decision step 224, the IVR, or other program, determines whether to retrieve additional content. If the IVR, or other program, determines to retrieve additional content, the method returns to step 220.

In a particular embodiment, the IVR may retrieve portions of content from the information store by submitting one or more queries to the information store. In a particular embodiment, each query may include one or more action-object names and a value for each action-object, which is derived from one or more verbal inputs. In another particular embodiment, each query may comprise more than one value and more than one action-object. Moreover, in a particular embodiment, at least one of the values can be derived from one or more non-verbal inputs.

In an illustrative embodiment, the content stored at the information store may be audio content or non-audio content. The non-audio content can be converted to audio content by the IVR so that it may be communicated to the caller. In an illustrative embodiment, the content can include table-driven instructional content.

Returning to decision step 224, if the IVR or other program determines not to retrieve additional content, the method ends at 226.

Figure 3:
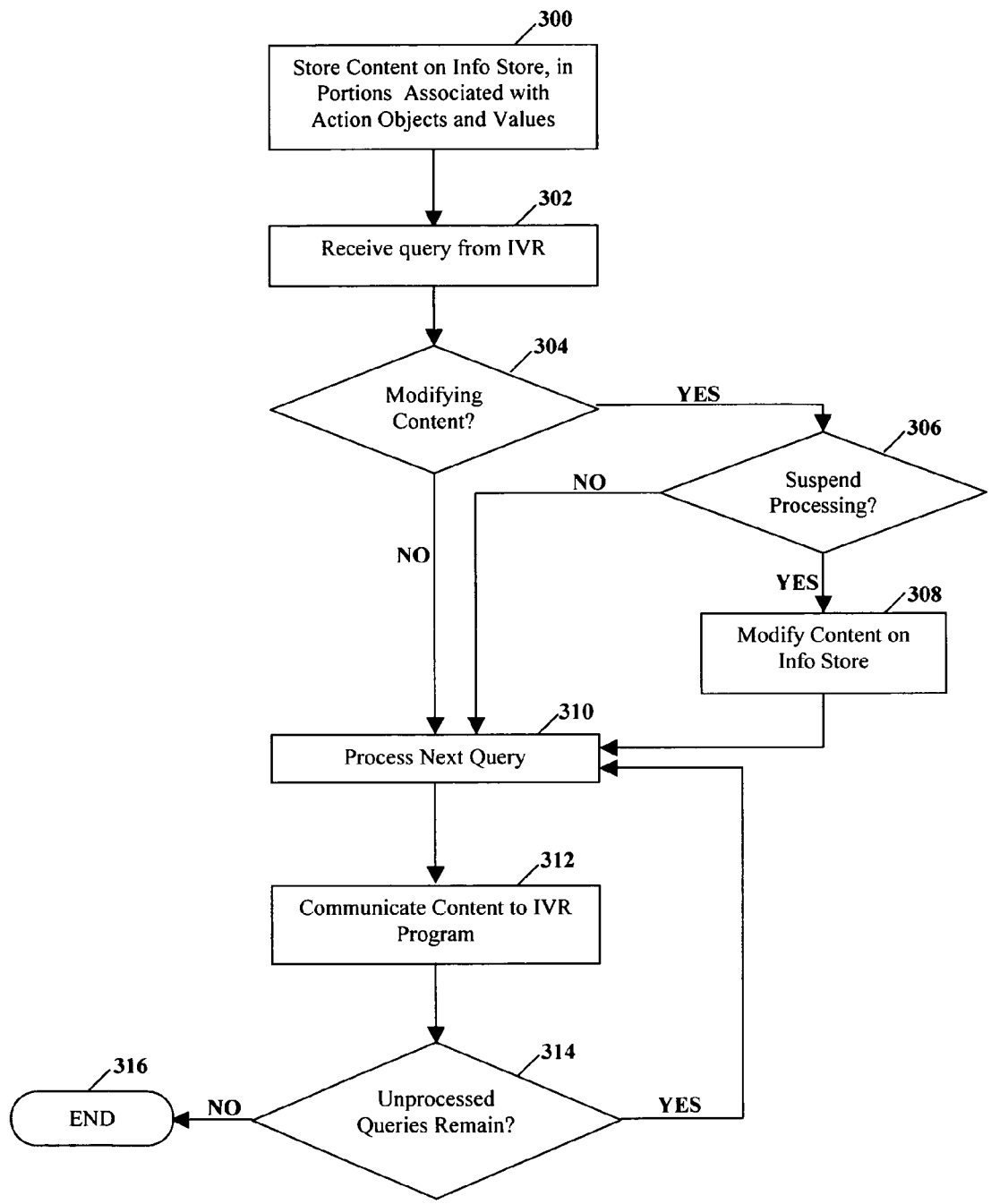
FIG. 3 is a flow diagram illustrating an alternative method of accessing content in a speech-enabled automated system.

Referring to FIG. 3, an alternative method to access content in a speech-enabled automated system is shown and commences at block 300. At block 300, content is stored at an information store. In a particular embodiment, a plurality of portions of content is stored at the information store. Further, each portion of content is associated with one or more action-objects and one or more action-object values. An example of an information store is described further with reference to FIG. 5.

At block 302, the information store receives one or more queries from an interactive voice response system (IVR). The information store is logically external to the IVR. In one embodiment, a query may include at least one action-object name and at least one value derived from one or more verbal inputs. In another embodiment, the query may comprise at least one action-object name, at least one value derived from a verbal input, and at least one value derived from a non-verbal input.

In a particular embodiment, the method may proceed to decision step 304, and the information store determines whether content is being modified. If the information store determines that no content is being modified, the method proceeds to block 310 and the next query is processed. Conversely, if the information store determines that content is being modified, the method proceeds to decision step 306. At decision step 306, the information store determines whether to suspend processing of the next query. If the information store determines not to suspend processing of the next query, the method proceeds to block 310. If the information store determines to suspend processing, the method proceeds to block 308, where content is modified before one or more queries are processed. In an illustrative embodiment, processing of queries can be suspended until all content in the information store is modified. In another illustrative embodiment, processing of queries can be suspended until the content related to one or more of the received queries is modified.

At block 310, the next query is processed. In an illustrative embodiment, queries may be maintained in a queue and processed individually. In another illustrative embodiment, multiple queries may be processed concurrently.

In a particular embodiment, the information store may process one or more queries by searching one or more records within the information store and retrieving one or more portions of the content from the record(s).

Once the information store has processed one or more queries, the method proceeds to block 312. The information store communicates content associated with the action-object names and values of each query to the IVR. In a particular embodiment, the method proceeds to decision step 314, and the information store determines whether any unprocessed queries remain. If unprocessed queries remain, the method returns to block 310 and the next query or queries are processed. If no unprocessed queries remain, the method terminates at block 316.

Figure 4:
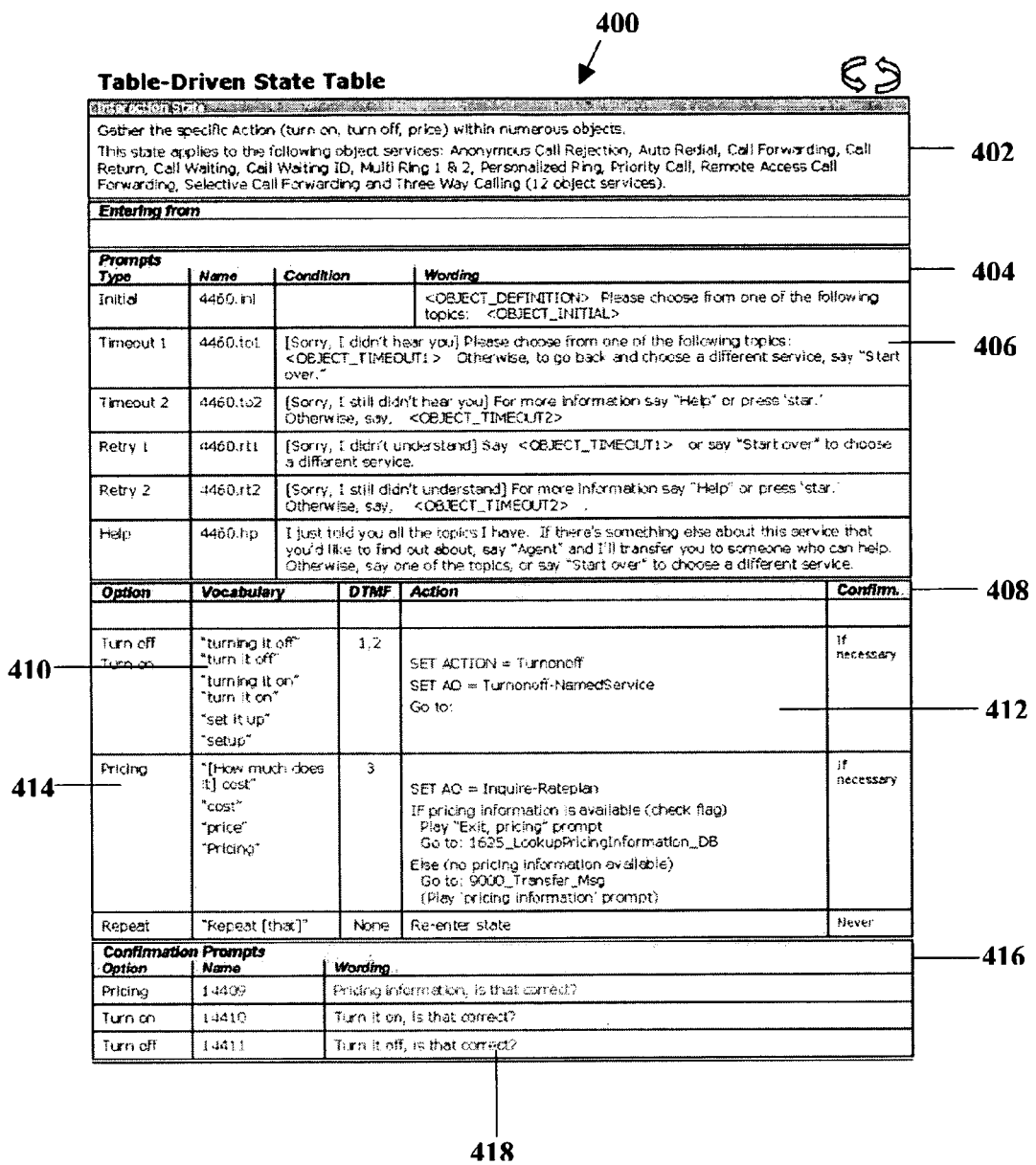
FIG. 4 illustrates an example of a table-driven state table.

Referring to FIG. 4, an example of a table-driven state table is shown and generally designated at 400. In a particular embodiment, the table-driven state table may include a header section 402 that identifies products or services for which the table-driven state table 400 is designed to receive verbal inputs, return content, or both. In this particular embodiment, the header section 402 may further include the purpose of the table-driven state table 400. For example, the header section 402 may state that the table-driven state table 400 is designed to gather one or more services (Call Waiting, Personalized Ring, Priority Call, etc.), in which the caller is interested, and the particular actions (turn on, turn off, pricing, etc.) that the caller wishes to perform regarding the services. The header section 402 may also indicate whether the system is to elicit verbal inputs, to set action-objects, or return content to the caller, or whether it is designed for other purposes.

As illustrated in FIG. 4, the table-driven state table 400 can include an audio section 404 that includes the structure 406 of audio that is communicated to a caller. The audio section 404 may include the structure 406 of prompts, content, or both. In a particular embodiment, the structure 406 of the audio can include fields, where content from an information store is inserted prior to communication to the caller. In an illustrative embodiment, the audio section 404 of the table-driven state table 400 includes a plurality of initial voice prompts. The audio section 404 may separate prompts by type and name and defines structures 406 for the wording of each prompt. Specific wording may be received from an information store and inserted into the fields, as needed. For example, the structure of wording for the Initial Prompt named "4460.ini" can state: "Please choose from one of the following topics:". Rather than listing the topics from which a caller may choose in the wording of the audio section 404, the listing of topics is replaced with field <OBJECT_INITIAL>. An audio version of the list may be retrieved and/or compiled from an information store and inserted dynamically into the audio prompt at the position of the designed field.

FIG. 4 indicates that the table-driven state table 400 also includes a logic section 408. The logic section 408 can include a plurality of potential verbal inputs 410 that may be received from a caller and rules 412 for assigning values to action-objects based on the verbal inputs 410 received. In the illustrative embodiment shown in FIG. 4, the verbal inputs 410 include vocabulary that may be received from a caller in response to prompts communicated based on the audio section 404. The logic section 408 can relate the vocabulary to various call selection options 414 that are cited in the header section 402. The logic section 408 also contains logic to assign values to action-objects, based on the vocabulary of the verbal inputs 410 received from callers. For example, if a caller states that the content desired relates to "Turning off a Named Service," then a value of "Turnoff-NamedService"

may be assigned to one or more action-objects. Likewise, if the caller states "How much does it cost?", a value of "RatePlan-NamedService" may be assigned to one or more action-objects.

It is to be understood that an action-object is a parameter with which content in an information store may be associated. Each action-object may comprise an action, such as "Power-Down"; an object, such as "Device"; a location, such as "Texas"; a language, such as "English"; or combinations of these, such that values of different action-objects may be combined dynamically. Additionally, other values derived from verbal inputs may be subsumed in any action-object, or within their own action-objects. For example, where location or language changes the content communicated to a caller, example action-object values may comprise "PowerDown," "Device," "Texas," "Spanish," or combinations thereof, such as "PowerDown-Device," "Texas-Spanish," "PowerDown Device-Texas-Spanish," and the like.

In a particular embodiment, one or more values may be assigned to one or more action-objects based on each verbal input. In another embodiment, each verbal input may be used to assign a single value to a single action-object pair.

In a particular embodiment, a separate table-driven state table is used to assign values to action-objects based on non-verbal inputs. In another embodiment, one or more table-driven state tables may be used to assign values to action-objects based on verbal and non-verbal inputs.

In a particular embodiment, the table-driven state table can include a confirmation section 416. The confirmation section 416 can contain wording of a plurality of confirmation prompts to confirm that the system has understood the verbal inputs received from the caller. The confirmation section can relate the options 414 of the logic section 408 to the wording 418 of related confirmation prompts. By confirming verbal inputs, the system may correctly assign values to action-objects according to the rules of the logic section 408.

Figure 5:
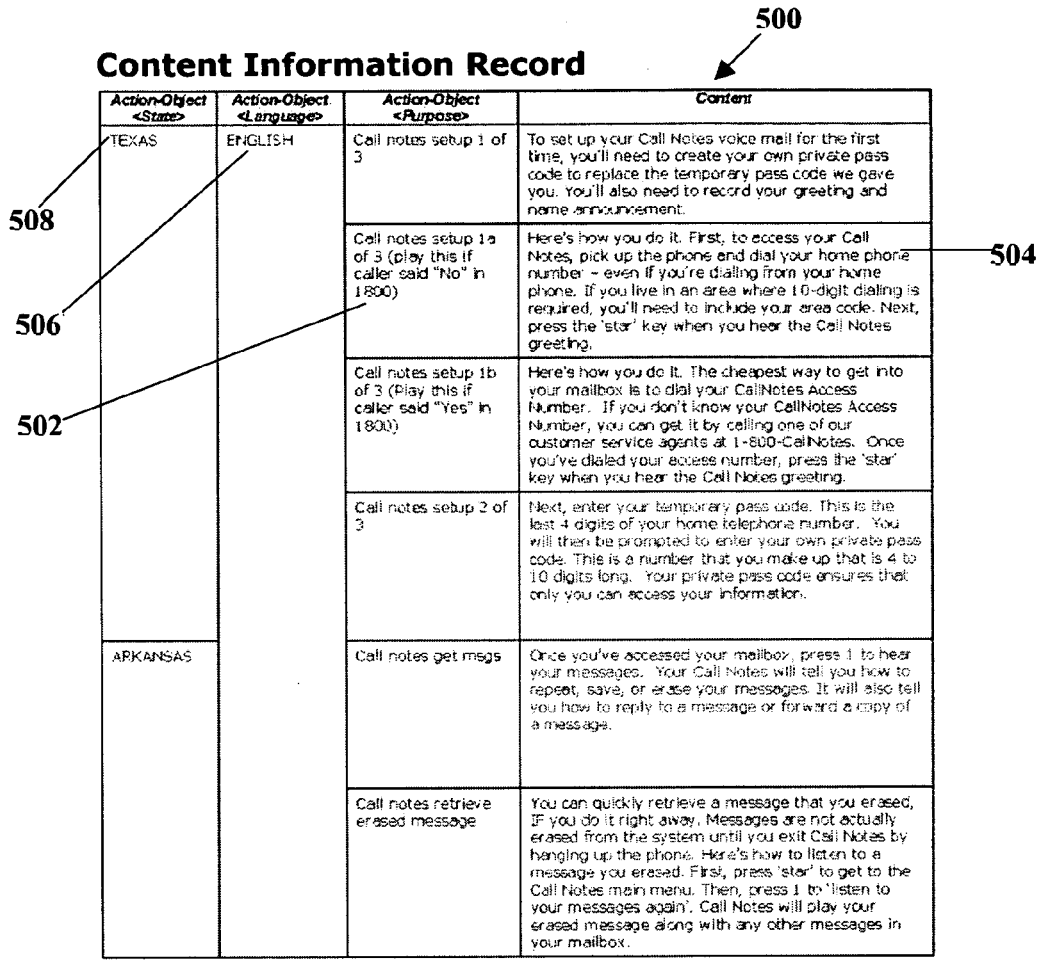
FIG. 5 illustrates an example of a content information store.

Referring to FIG. 5, an example of a content record in an information store is shown and designated generally at 500. The record 500 illustrates an example of associations between action-objects, values, and content within an information store. These associations may be present in an information store, whether or not the information store utilizes records. In the illustrative embodiment shown in FIG. 5, a first portion of the content 504 is associated with a first action-object 502, named "Purpose." The content 504 can vary according to values of the first action-object. For example, if the value of the first-action object 502 is "Call Notes Setup 1a," the content 504 that is communicated to the caller as audio instructional content may comprise:

Here's how you do it. First, to access your Call Notes, pick up the phone and dial your home phone number—even if you're dialing from your home phone. If you live in an area where 10-digit calling is required, you'll need to include your area code. Next, press the star key, when you hear the Call Notes greeting.

In the illustrative embodiment shown in FIG. 5, a second portion of the content 504 is associated with a second action-object 506, named "Language." The content 504 can vary according to values of the first action-object and the second action-object. For example, the content 504 regarding accessing a voice mail service may be selected based on the value of the first action-object 502 is "Call Notes Setup 1a," and the content may be translated into Spanish or Mandarin Chinese, if the value of the second action-object 506 is "Spanish" or "Mandarin."

In the illustrative embodiment shown in FIG. 5, a third portion of the content 504 is further associated with a second action-object 508, named "State." The content 504 can vary according to values of the first action-object and the second action-object. For example, content 504 regarding setting up a voice mail service may vary depending on whether the value of the first action-object is "Call Notes Setup 1a" and the instructions for that action may vary, based on whether the value of the second action-object 508 is "Texas" or "Arkansas."

Figure 6:
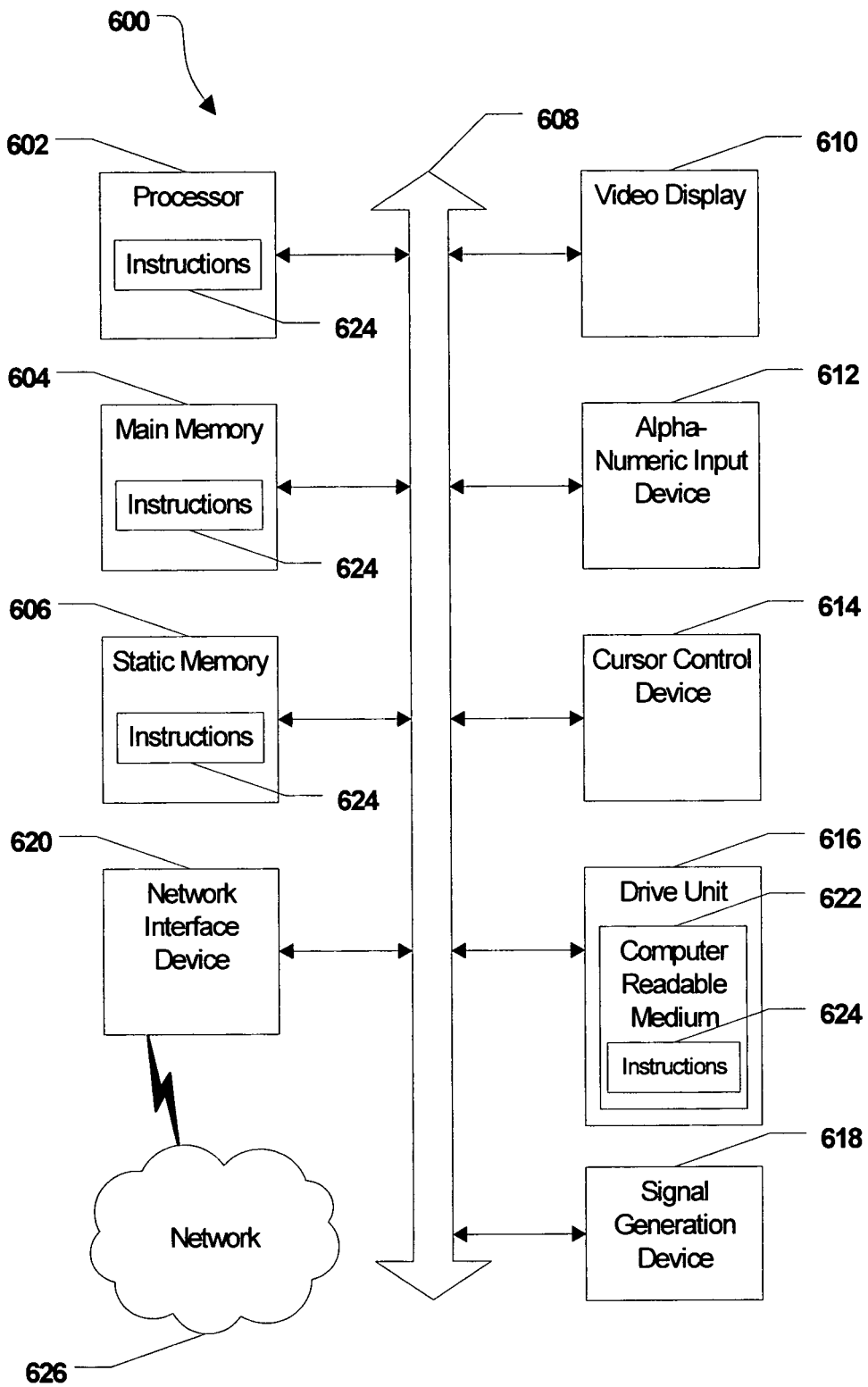
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of accessing content at a speech-enabled automated system, the method comprising:
   receiving a verbal input at an interactive voice response system; and
   accessing an information store to retrieve content based on the verbal input, wherein the information store determines whether to suspend retrieval of the content until the content is available when information store content of the information store is being modified and modifications to the information store content could influence retrieval of the content, and wherein the information store is logically external to the interactive voice response system.

2. The method of claim 1, further comprising communicating a prompt to a caller prior to receiving the verbal input.

3. The method of claim 1, further comprising:
   determining a first action-object and an associated first value based on the verbal input; and
   retrieving content associated with the first value from the information store.

4. The method of claim 1, further comprising:
   receiving a non-verbal input;
   determining a second action-object and an associated second value based on the non-verbal input; and
   retrieving content associated with the second value from the information store.

5. The method of claim 3, further comprising:
   determining a next action-object and an associated next value based on the verbal input; and
   retrieving content associated with the next value from the information store.

6. The method of claim 4, further comprising:
   determining an additional action-object and an associated additional value based on the non-verbal input; and
   retrieving content associated with the additional value from the information store.

7. The method of claim 1, further comprising submitting a query to the information store.

8. The method of claim 1, further comprising communicating the content retrieved from the information store to a caller.

9. A method of providing content at a speech-enabled automated system, the method comprising:
   storing a plurality of content items at an information store, wherein each of the plurality of content items is associated with an action-object;
   receiving a query at the information store from an interactive voice response system, wherein the information store is logically external to the interactive voice response system;
   determining whether a modification of content is in progress at the information store;
   determining, when the modification is in progress, whether to suspend processing of the query until the modification is complete; and
   processing the query after the modification is complete, in response to a determination to suspend the processing of the query.

10. The method of claim 9, wherein each action-object comprises a parameter chosen from a group consisting of a desired action, a call purpose, a product, a service, a location, a language, and any combination thereof.

11. The method of claim 10, wherein the content items relate to a service chosen from a group consisting of call notes, voice mail, call blocking, privacy management, call tracing, call return, auto-redial, call forwarding, call waiting, direct reply, caller ID, and remote access.

12. The method of claim 9, wherein the query comprises a particular action-object having a value that is derived from a verbal input received at the interactive voice response system.

13. The method of claim 12, wherein the query comprises a particular action-object having a value that is derived from a non-verbal input received at the interactive voice response system.

14. The method of claim 9, further comprising:
   providing an answer to the interactive voice response system, wherein the answer is used as part of a response to a caller by the interactive voice response system.

15. The method of claim 9, further comprising:
   searching at least one record at the information store for at least one of the plurality of content items;
   retrieving, from the at least one record at the information store, the at least one of the plurality of content items; and
   communicating the at least one of the plurality of content items to the interactive voice response system.

16. The method of claim 9, wherein each of the plurality of content items comprises table-driven instructional content.

17. A system of managing content at a speech-enabled automated system, the system comprising:
   a server, wherein the server comprises:
      a processor;
      a memory accessible to the processor; and
      an interactive voice response system embedded within the memory, wherein the interactive voice response system comprises:
         instructions executable by the processor to process a verbal input; and
         instructions executable by the processor to access an information store that is external to the interactive voice response system to retrieve content, wherein the content retrieved from the information store is associated with the verbal input, and wherein the information store determines whether to suspend retrieval of the content until the content is available when information store content of the information store is being modified and modifications to the information store content could influence retrieval of one or more fields of the content.

18. The system of claim 17, wherein the server further comprises an interface to communicate with a communications network.

19. The system of claim 18, wherein the communications network comprises a network chosen from a group consisting of a public switched telephone network, a Voice-over-Internet Protocol network, a cellular telephone network, a mobile telephone network, and combinations thereof.

20. The system of claim 17, wherein the information store further comprises a plurality of content items, and wherein each of the plurality of content items is associated with at least one action-object and at least one value.

21. The system of claim 20, wherein the information store further comprises:
    computer-readable instructions to search at least one record at the information store for at least one of the plurality of content items; and
    computer-readable instructions to retrieve, from the at least one record, the at least one of the plurality of content items.

22. A computer-readable storage device comprising instructions that, when executed by a processor, cause the processor to perform operations comprising:
    processing a verbal input from a caller;
    accessing an information store that is logically external to the computer-readable storage device to retrieve content based on at least one query, wherein the at least one query is associated with the verbal input, and wherein the information store determines whether to suspend processing of the at least one query until the content is available when information store content of the information store is being modified and modifications to the information store content could influence an answer to the at least one query; and
    receiving the answer to the at least one query, wherein the answer is used as part of a response to the caller.

23. The computer-readable storage device of claim 22, wherein the operations further comprise communicating a prompt to the caller prior to receiving the verbal input.

24. The computer-readable storage device of claim 22, wherein the operations further comprise:
    determining a first action-object and a first value associated with the first action-object, wherein the first value is derived from the verbal input; and
    retrieving content associated with the first value.

25. The non transitory computer-readable storage device of claim 22, wherein the operations further comprise:
    instructions that, when executed by the processor, cause the processor to process a non-verbal input;
    instructions that, when executed by the processor, cause the processor to determine a second action-object and a second value associated with the second action-object, wherein the second value is derived from the non-verbal input; and
    instructions that, when executed by the processor, cause the processor to retrieve content associated with the second value.

26. The computer-readable storage device of claim 24, wherein the operations further comprise:
    instructions that, when executed by the processor, cause the processor to determine a next action-object and a next value associated with the next action-object, wherein the next value is derived from the verbal input; and
    instructions that, when executed by the processor, cause the processor to retrieve content associated with the next value.

27. The computer-readable storage device of claim 25, wherein the operations further comprise:
    instructions that, when executed by the processor, cause the processor to determine an additional action-object and an additional value associated with the additional action-object, wherein the additional value is derived from the verbal input; and
    instructions that, when executed by the processor, cause the processor to retrieve content associated with the additional value.

28. The computer-readable storage device of claim 22, wherein the operations further comprise submitting the at least one query to the information store.

29. The computer-readable storage device of claim 22, wherein the operations further comprise communicating the response to the caller.

* * * * *

UNITED STATES PATENT AND TRADEMARK OFFICE
CERTIFICATE OF CORRECTION

PATENT NO. : 8,526,577 B2  
APPLICATION NO. : 11/212939  
DATED : September 3, 2013  
INVENTOR(S) : Julie A. Idler et al.

Page 1 of 1

It is certified that error appears in the above-identified patent and that said Letters Patent is hereby corrected as shown below:

In the Claims, Column 15, Claim 25, Line 1, "The non transitory computer-readable storage device of" should read --The computer-readable storage device of--.

Signed and Sealed this  
Fourth Day of March, 2014

Michelle K. Lee  
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,526,577 B2 |
| APPLICATION NO. | : 11/212939 |
| DATED | : September 3, 2013 |
| INVENTOR(S) | : Julie A. Idler et al. |

It is certified that error appears in the above-identified patent and that said Letters Patent is hereby corrected as shown below:

In the Claims, Column 15, Claim 25, Line 36, "The non transitory computer-readable storage device of" should read --The computer-readable storage device of--.

This certificate supersedes the Certificate of Correction issued March 4, 2014.

Signed and Sealed this
Twenty-fifth Day of March, 2014

Michelle K. Lee
*Deputy Director of the United States Patent and Trademark Office*